US010130917B2

(12) United States Patent
Panaitescu et al.

(10) Patent No.: US 10,130,917 B2
(45) Date of Patent: Nov. 20, 2018

(54) FILTERING ARTICLE CONTAINING TITANIA NANOTUBES

(71) Applicant: Northeastern University, Boston, MA (US)

(72) Inventors: Eugen Panaitescu, Brookline, MA (US); Latika Menon, Malden, MA (US)

(73) Assignee: Northeastern University, Boston, MA (US)

( * ) Notice: Subject to any disclaimer, the term of this patent is extended or adjusted under 35 U.S.C. 154(b) by 471 days.

(21) Appl. No.: 14/765,229

(22) PCT Filed: Feb. 4, 2014

(86) PCT No.: PCT/US2014/014631
§ 371 (c)(1),
(2) Date: Jul. 31, 2015

(87) PCT Pub. No.: WO2014/123878
PCT Pub. Date: Aug. 14, 2014

(65) Prior Publication Data
US 2015/0367289 A1    Dec. 24, 2015

Related U.S. Application Data

(60) Provisional application No. 61/761,472, filed on Feb. 6, 2013.

(51) Int. Cl.
*B01D 71/02* (2006.01)
*B01D 15/08* (2006.01)
(Continued)

(52) U.S. Cl.
CPC .......... *B01D 71/024* (2013.01); *B01D 15/08* (2013.01); *B01D 67/0044* (2013.01);
(Continued)

(58) Field of Classification Search
None
See application file for complete search history.

(56) References Cited

U.S. PATENT DOCUMENTS 6,027,775 A    2/2000 Kasuga et al.
6,537,517 B1   3/2003 Kasuga et al.
(Continued)

FOREIGN PATENT DOCUMENTS

CN    101 279 168 A    10/2008
CN    102 511 928 A    6/2012
(Continued)

OTHER PUBLICATIONS

International Search Report & Written Opinion on PCT/US2014/014631 dated May 14, 2014.
(Continued)

*Primary Examiner* — Krishnan S Menon
*Assistant Examiner* — Ryan B Huang
(74) *Attorney, Agent, or Firm* — Hamilton, Brook, Smith & Reynolds, P.C.

(57) ABSTRACT

Provided in one embodiment is a filtering article, comprising: powders comprising bundles of nanotubes, each bundle comprising hollow titania nanotubes. Embodiments of the methods of making and using the filtering articles are also provided.

20 Claims, 6 Drawing Sheets

(51) Int. Cl.

| | | |
|---|---|---|
| C01G 23/047 | (2006.01) | |
| B01D 69/02 | (2006.01) | |
| C25D 11/02 | (2006.01) | |
| C25D 7/04 | (2006.01) | |
| B01D 69/04 | (2006.01) | |
| B01D 67/00 | (2006.01) | |
| C25D 11/26 | (2006.01) | |

(52) U.S. Cl.
CPC ......... *B01D 67/0065* (2013.01); *B01D 69/02* (2013.01); *B01D 69/04* (2013.01); *B01D 69/043* (2013.01); *C01G 23/047* (2013.01); *C25D 7/04* (2013.01); *C25D 11/02* (2013.01); *C25D 11/26* (2013.01); *B01D 2323/00* (2013.01); *B01D 2325/20* (2013.01); *B01D 2325/36* (2013.01); *C01P 2004/03* (2013.01); *C01P 2004/13* (2013.01); *C01P 2004/61* (2013.01); *C01P 2004/62* (2013.01); *C01P 2004/64* (2013.01)

(56) References Cited

U.S. PATENT DOCUMENTS

| | | | | |
|---|---|---|---|---|
| 7,011,737 | B2 | 3/2006 | Varghese et al. | |
| 7,592,039 | B2 | 9/2009 | Huang et al. | |
| 2005/0255315 | A1* | 11/2005 | Yamanaka | B81B 1/00 428/357 |
| 2009/0107334 | A1* | 4/2009 | Oh-ishi | B01D 53/02 95/139 |
| 2010/0024879 | A1 | 2/2010 | Richter et al. | |
| 2010/0187172 | A1* | 7/2010 | Paulose | B82Y 30/00 210/506 |
| 2010/0233812 | A1 | 9/2010 | Sun et al. | |
| 2011/0315624 | A1* | 12/2011 | Jeong | B01D 63/02 210/500.23 |
| 2012/0160695 | A1* | 6/2012 | Misra | C25B 1/003 205/148 |
| 2013/0098833 | A1 | 4/2013 | Sun et al. | |
| 2016/0207789 | A1 | 7/2016 | Tang et al. | |

FOREIGN PATENT DOCUMENTS

| | | |
|---|---|---|
| EP | 0 832 847 A1 | 4/1998 |
| JP | 2007-130267 A | 5/2007 |
| JP | 2012-153561 A | 8/2012 |
| WO | WO 2011/133116 A1 | 10/2011 |
| WO | WO 2014/123878 A1 | 8/2014 |
| WO | WO 2015/038076 A1 | 3/2015 |

OTHER PUBLICATIONS

Albu, Sergiu P., et al. "Self-Organized, Free-Standing TiO2 Nanotube Membrane for Flow-through Photocatalytic Applications" Nano Letters, vol. 7, No. 5, pp. 1286-1289 (2007).

Herring, Angela. "Titania nanotubes go commercial" Northeastern News Article, Oct. 31, 2012.

Menon, Latika. "Photoelectrochemical Properties of High-Aspect Ratio Titania Nanotubes", Colorado Renewable Energy Collaboratory, Efficient Conversion of Solar Energy to Electricity and Fuels Workshop, Aug. 13-15, 2008.

Zhang, Haimin, et al. "Direct growth of hierarchically structured titanate nanotube filtration membrane for removal of waterborne pathogens" Journal of Membrane Science, vol. 343, pp. 212-218 (2009).

Zhang, Xiwang, et al. "Grafted multifunctional titanium dioxide nanotube membrane: Separation and photodegradation of aquatic pollutant" Applied Catalysis B: Environmental, vol. 84, pp. 262-267 (2008).

Database WPI Week 201302 Thomson Scientific, London, GB; AN 2012-J78550 XP002760975.

Lin, J., et al., "Facile Fabrication of Free-Standing $TiO_2$ Nanotube Membranes with Both Ends Open Via Self-Detaching Anodization," *Electrochemistry Communications*, 12(8): 1062-1065 (2010).

Choi, W.-Y., et al., Fabrication and Photocatalytic Activity of a Novel Nanostructured $TiO_2$ Metal Membrane, *Desalination*, 279(1): 359-366 (2011).

Yang, C.-C., et al., "Direct Methanol Fuel Cell Based on Poly(Vinyl Alcohol)/Titanium Oxide Nanotubes/Poly(Styrene Sulfonic Acid) (PVA/nt-$TiO_2$/PSSA) Composite Polymer Membrane," *J Power Sources*, 195(11): 3407-3415 (2010).

PCT/US2014/014631 International Preliminary Report on Patentability dated Aug. 11, 2015 entitled "Filtering Article Containing Titania Nanotubes."

* cited by examiner (a)

(b)

(c)

(a)

(b)

FILTERING ARTICLE CONTAINING TITANIA NANOTUBES

RELATED APPLICATION

This application is a U.S. National Stage Application of International Application No.: PCT/US2014/014631, titled "FILTERING ARTICLE CONTAINING TITANIA NANOTUBES", and filed Feb. 4, 2014, which claims priority to U.S. Provisional Application Ser. No. 61/761,472, filed Feb. 6, 2013, both of which are hereby incorporated by reference in their entirety.

BACKGROUND

Several types of filtration membranes are currently commercially available. However, these materials may be very expensive to manufacture due either to the equipment needed to fabricate the material or the material itself. For example, silica nanoparticles with 200 nm particle size and 4 nm pore size 4 nm may cost about $172/5 g. The carbon nanopowders with particle size smaller than 500 nm may cost about $121/5 g. The carbon nanotubes may cost up to about $800/g. The Whatman anodic alumina membrane may cost about $512/pack of 50. A lot of room for improvement remains to lower the cost of manufacturing a filtration membrane. Additionally, because a filtration membrane is subjected to an environment that may be highly corrosive, pre-existing filtration membranes frequently encounter the challenge of having a short operation life.

SUMMARY

In view of the foregoing, the Inventors have recognized and appreciated the advantages of a filtering article containing titania nanotubes and methods of making and using same. The titania nanotubes may be made by an electrochemical synthesis method.

Accordingly, provided in one embodiment is a filtering article, comprising powders comprising bundles of nanotubes, each bundle comprising hollow titania nanotubes.

Provided in another embodiment is a method of separating, the method comprising: separating a filtrate from a fluid containing the filtrate by exposing the fluid to a filtering article; wherein the filtering article comprises powders comprising bundles of nanotubes, each bundle comprising hollow titania nanotubes.

Provided in another embodiment is a method of making, the method comprising: anodizing titanium to form a filtering article, wherein the filtering article comprises: (i) powders comprising bundles of nanotubes, each bundle comprising hollow titania nanotubes; and, optionally, (ii) a freestanding array of hollow titania nanotubes aligned in parallel.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
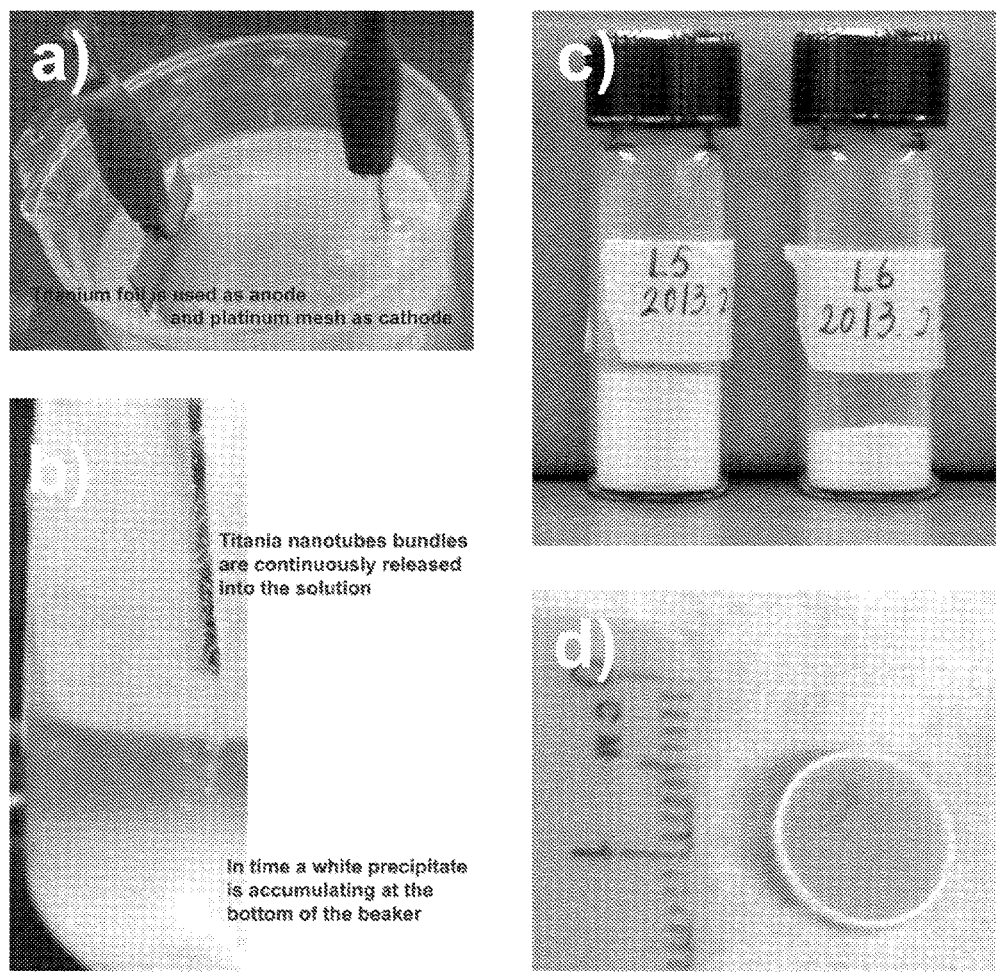
FIGS. 1(a)-1(d) show production of powders containing titania nanotubes in one embodiment: (a) lab scale anodization setup; (b) nanotubes formation at the anode site; (c) resulting powder containing titania nanotubes; and (d) pelletized powder (1 cm diameter).

Following below are more detailed descriptions of various concepts related to, and embodiments of, an inventive filtering article containing titania nanotubes and methods of making and using same. The method making may involve an electrochemical synthesis method. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Filtering Articles

The term "filtration" herein may refer to any separation application in which a first material is separated from a second material. Similarly, the term "filtering article" may refer to any medium that provides separation (e.g., filtration)

functionality. The filtering article may include a filtration membrane or a compact material (or a material in any suitable form) employed in such a separation application.

Titania (or titanium dioxide, $TiO_2$) is a hydrophilic material that may have important applications for water filtration and other separation applications. High temperature resistance and chemical resistance in the whole pH range make this material suitable when such rugged filtration conditions are needed. Specifically for titania nanotubes, additional advantages, such as higher porosity and higher active surface area, may be achieved while maintaining the separation efficiency. The titania described herein may be found in nature or may be found by a suitable process. For example, the titania herein may comprise anodized titanium.

Starting from titania powders where each powder grain may be a bundle of tightly bound nanotubes, ceramic filtration devices may be developed by pressing, molding, and/or sintering them into specific shapes. As further described below, water-oil separation may be achieved using disc-shaped pellets produced by pressing the powders described herein inside cylindrical dies. Alternatively, the powders described herein may be compacted inside a liquid chromatography column, including (Ultra) High Performance Liquid Chromatography (HPLC, UHPLC) columns for niche separation applications involving harsh temperatures and pH conditions.

Provided in another embodiment is a method of separating, the method comprising: separating a filtrate from a fluid containing the filtrate by exposing the fluid to a filtering article; wherein the filtering article comprises powders comprising bundles of nanotubes, each bundle comprising hollow titania nanotubes.

The filter article may comprise powders, as shown in FIGS. 1(a)-1(d). The powders may comprise bundles (or "grains") of nanotubes, as shown in FIG. 2(a). Each of these bundles may comprise hollow titania nanotubes, as shown in FIGS. 2(b)-2(c). At least some of the bundles may have a length of at least about 1 micron—e.g., at least about 5 microns, about 10 microns, about 20 microns, about 30 microns, about 40 microns, about 50 microns, about 60 microns, about 70 microns, about 80 microns, about 90 microns, about 100 microns, about 150 microns, about 200 microns, about 250 microns, about 300 microns, about 350 microns, about 400 microns, about 450 microns, about 500 microns, or higher. In one embodiment, the length may be between about 0.5 microns and about 200 microns—e.g., about 1 micron and about 100 microns, about 5 microns and about 50 microns, etc. Other length values are also applicable. The hollow nanotubes may have an elongated geometry, with an aspect ratio of at least 2—e.g., at least 5, 10, 20, 50, 100, or higher. Also, because the bundles comprise hollow titania nanotubes, at least some of the titania nanotubes in a bundle may have the same length as the bundle itself.

At least some of the bundles may have a width of at least about 0.5 microns—e.g., at least about 1 microns, about 1.5 microns, about 2 microns, about 2.5 microns, about 3 microns, about 3.5 microns, about 4 microns, about 4.5 microns, about 5 microns, about 10 microns, about 20 microns, about 50 microns, about 100 microns, or higher. In one embodiment, the width may be between about 0.5 microns and about 100 microns—e.g., about 1 micron and about 50 microns, about 5 microns and about 20 microns, etc. Other width values are also applicable. The term "width" herein describes a characteristic dimension of a bundle and can be replaced by other terms, such as "diameter" in the case that the bundle has a cylindrical geometry—these other terms would convey the same meaning as "width".

The hollow titania nanotubes may have a tubular geometry. At least some of these hollow titania nanotubes may have a diameter that is more than one order of magnitude smaller than the width of the bundle. For example, the diameter may be less than or equal to about 250 nm—e.g., less than or equal to about 200 nm, about 150 nm, about 100 nm, about 50 nm, about 25 nm, about 20 nm, about 10 nm, about 5 nm, or smaller. In one embodiment, the diameter of the hollow titania nanotube is between about 5 nm and about 100 nm—e.g., between about 10 nm and about 80 nm, between about 20 nm and about 60 nm, between about 25 nm and about 50 nm between about 30 nm and about 44 nm, etc. Other diameter values are also applicable.

Figure 2:
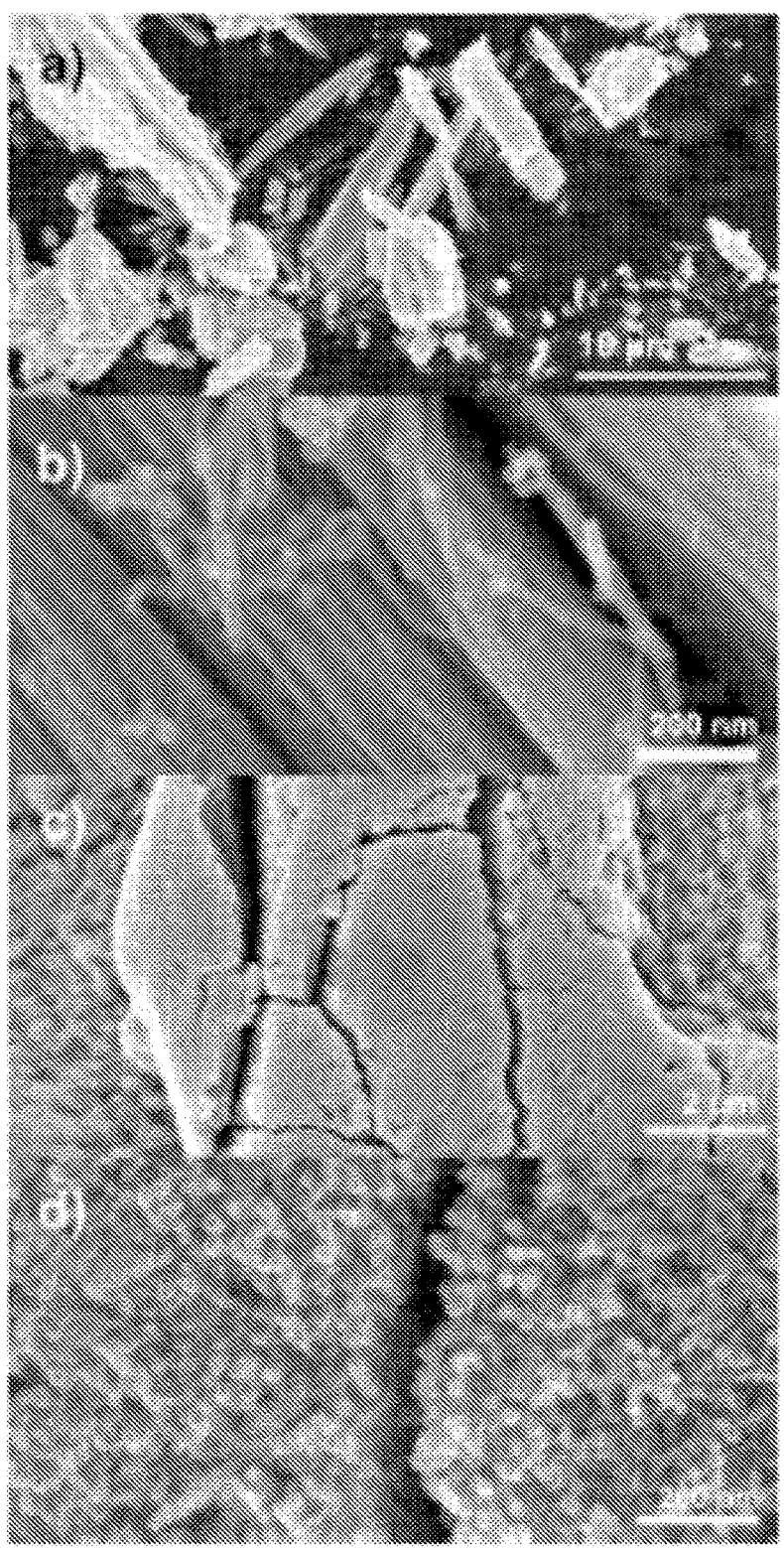
FIGS. 2(a)-2(d) show SEM images of powders containing titania nanotubes in one embodiment: (a) SEM image of powder grains several microns in size; (b) higher magnification side view showing the nanomorphology of a grain of about 25 nm diameter tubes tightly bundled; (c) top view of such a bundle; and (d) higher magnification of an area from the previous image, showing the nanotubular structure.

The titania nanotubes in powder form may be further compressed, molded, and/or sintered into a pellet form, as shown in FIG. 1(d). The pellets may be efficient in letting a fluid containing a filtrate (or any material to be separated from the fluid) flow through under moderate pressures while blocking the flow of filtrate, such as oils, such as kerosene, by retaining the filtrate above the surface of the pellet. The powders may be pressed under any suitable pressure, such as 5000 psi, to form filtration pellets. The pellets may have any suitable dimensions, including diameter and thickness. For example, the diameter may be at least about 0.5 cm—e.g., at least about 1 cm, about 1.5 cm, about 2 cm, about 2.5 cm, about 3 cm, about 3.5 cm, about 4 cm, or larger. Other diameter values are also applicable. The thickness of the pellet may be at least 0.5 mm—e.g., at least about 1 cm, about 1.5 cm, about 2 cm, about 2.5 cm, about 3 cm, about 3.5 cm, about 4 cm, or larger. Other thickness values are also applicable. Other geometries than circular pellet are also possible. For example, the powders may be formed into a hollow cylinder with a length in the cm range (e.g., a few centimeters to tens of centimeters, or more) and an internal diameter of the cylinder in the cm range (e.g., from about 0.5 cm to about 10 cm, or more)

Figure 4:
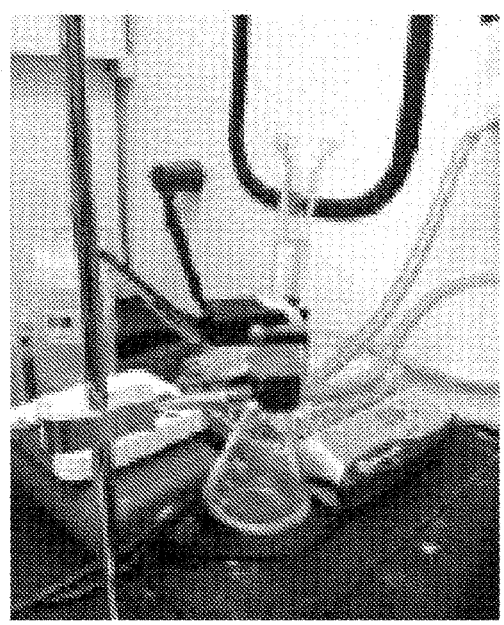
FIGS. 4(a)-4(c) show the filtration experiments in one embodiment: (a) a simple dead-end flow glassware filtration setup; (b) a simulated cross-flow filtration setup before the experiment; and (c) the set up of (b) at the completion of the experiment.
Figure 4:
Figure 5:
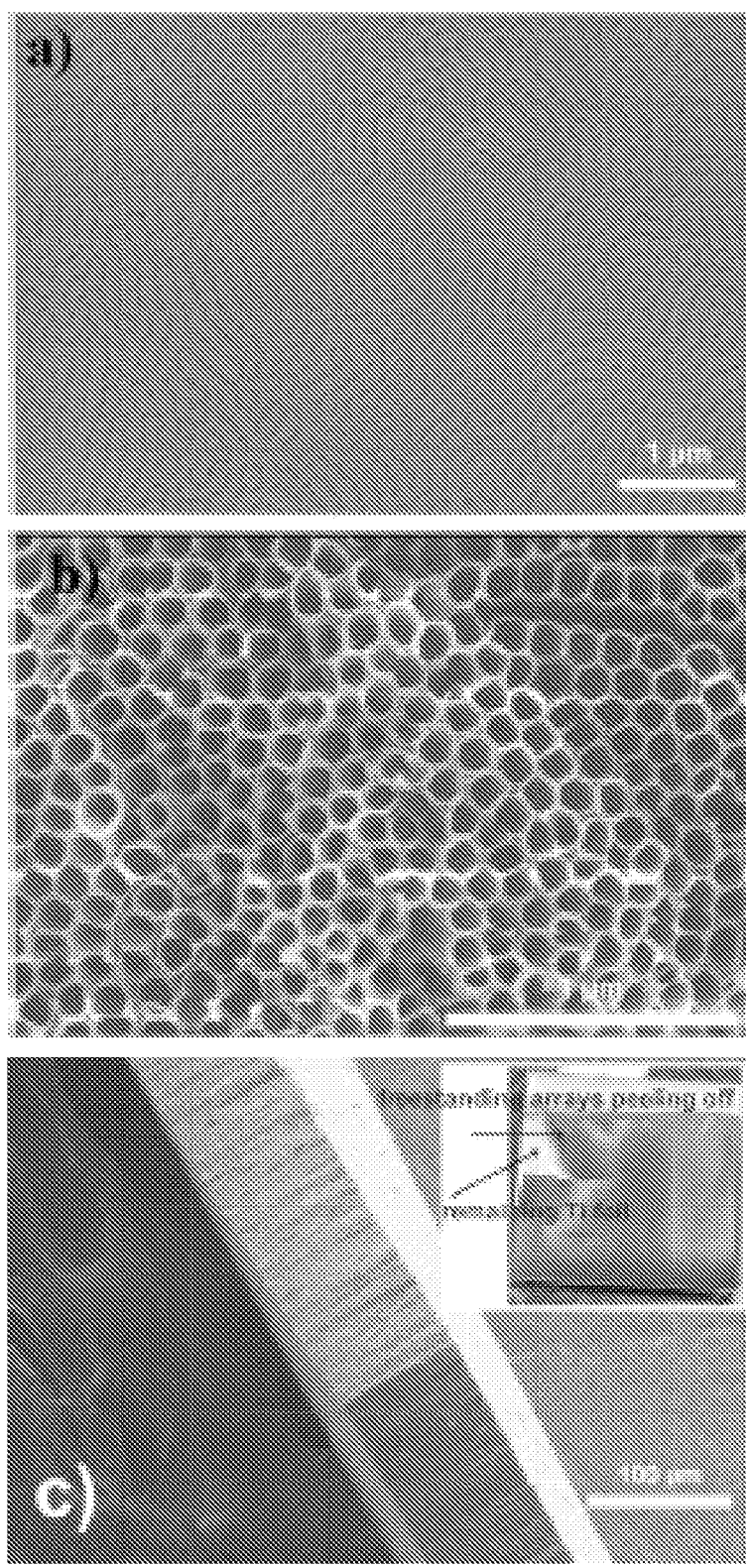
FIGS. 5(a)-5(c) show a freestanding titania nanotubes array in one embodiment: (a) bottom view of the array; b) top view of the array; and (c) side view of the array (inset shows a digital picture of the membrane peeling off the titanium foil).

The filtering article may comprise a freestanding array of hollow titania nanotubes aligned in parallel, as shown in FIGS. 4(a)-4(c). For example, the topographical surface area of the array may be at least 0.5 $cm^2$—e.g., at least about 1 $cm^2$, about 2 $cm^2$, about 4 $cm^2$, about 6 $cm^2$, about 8 $cm^2$, about 10 $cm^2$, or larger. Other topographical surface area values are also applicable. The diameter of the hollow nanotubes in the array may be less than or equal to about 800 nm—e.g., less than or equal to about 600 nm, about 500 nm, about 400 nm, about 300 nm, about 200 nm, about 100 nm, about 80 nm, about 60 nm, about 40 nm, etc. In one embodiment, the diameter may be between about 40 nm and about 600 nm, between about 60 nm and about 300 nm, between about 80 nm and about 200 nm, etc. Other diameter values are also applicable. The hollow titania nanotubes that constitute the array may have dimensions of any of values described above for those hollow titania nanotubes in the powders.

The filtering article may comprise both of the aforedescribed powders and the freestanding arrays. The powders and the freestanding arrays may be integrated together into one single filtering article, as explained further below. In one embodiment, the powders and the arrays are integrated in a filtering article such that the arrays are positioned in the side of the filtering article that will be exposed to the fluid material (containing the filtrates) to be filtered. In one embodiment, the face of the filtering article facing the fluid contains an array of uniformly aligned titania nanotubes.

Whichever filtrates do not pass through the first stage of filtration with the hollow nanotubes in the array will be left over on the surface. Whichever filtrates do pass through the hollow nanotubes will then undergo a second stage of filtration, during which the fluid (after the first stage) will be exposed to powders comprising bundles of hollow titania nanotubes to filter, which will provide the second stage of filtration. The combination of different nanotubes with different geometries may provide a high degree of filtration better than pre-existing commercial membranes.

The hollow titania nanotubes of both the powder and the freestanding array embodiments may be optionally functionalized. For example, the nanotubes may be functionalized by a hydrophobic material (or moiety). The nanotube may be functionalized by an olephobic material. Any suitable material or moiety may be used, depending on the application. For example, the material may be organic or inorganic. In one embodiment, the material may be a ligand. In one embodiment, the material may be octadecyl (C18), which may be employed as a functionalizing agent in HPLC, fluorooctyltrichlorosilane ("FOTS"), etc. The nanotubes may also be doped. Any suitable dopants may be used, depending on the application. The dopants may comprise, for example iron, cobalt, carbon, and the like.

Method of Making the Filtering Articles

Depending on the desired filtering article properties, the methods of making the filtering articles described herein may be adjusted to tailor to the application. For example, the titania may be made by anodizing titanium. Provided in one embodiment is a method of making, the method comprising: anodizing titanium to form a filtering article. The filtering article may be any of those described herein, including one that comprises (i) powders comprising bundles of nanotubes, each bundle comprising hollow titania nanotubes; and, optionally, (ii) a freestanding array of hollow titania nanotubes aligned in parallel.

The anodization of titanium may be carried out by, for example, using an electrochemical method. One example of such a method is described in U.S. Pub. No. 2010/0014879. In one embodiment wherein the final product is the powder embodiment, the anodization may be carried out in an electrolyte solution comprising at least about 1 mM chloride and having a pH in the range of about 1 to about 7. The Cl$^-$-containing electrolyte solution may be an aqueous solution. In another embodiment wherein the final product is the array embodiment, the anodization may be carried out in a non-aqueous electrolyte solution comprising at least about 1 mM fluoride.

In the case where the filtering article comprises powders, the method may further comprise forming the powders into a pellet. The formation may be carried out using any suitable processing techniques, including, for example, pressing, sintering, molding, etc. In the case where the filtering article comprises both powders and the freestanding array, the method of making may further include a process of integrating the powders and array into one single filtering article. The integration may be achieved by any suitable methods. For example, the freestanding array may be placed on top of the powder-containing pellet, and the array and the pellet may be sealed at the edge. The sealing may be achieved by, for example, a supporting polymer. Alternatively, the pellet and the array may be two separate components in the filtering article and the fluid to be filtered passes through the two consecutive filtering components.

Depending on the desired product and application, the filtering article may be further functionalized. As described above, titania nanotubes may be functionalized by, for example, at least one hydrophobic material (or moiety), which may be any of the functionalizing materials described above. Additionally, the titania nanotubes may be doped by at least one dopant, which may be any of the dopant materials described above.

Applications

Due at least to the aforedescribed materials and methods, the filtration filtering article provided herein may be used in a variety of applications. The applications may include, but are not limited to, oil-water separation, water treatment and filtration (simultaneous or not with water sterilization), waste water treatment, slurry filtration, chemical separation and liquid chromatography. For example, the filtering article may be used in a water filtration membrane, water-oil separation membrane, and a liquid chromatography column. Other applications in which separations of at least one filtrate from a material containing the at least one filtrate may employ the filtration membranes described herein. The filtrate may be, for example, oil (e.g., kerosene) and the material containing the filtrate may be a mixture of water containing the oil.

In the case of liquid chromatography, the liquid chromatography column may be an HPLC or UHPLC. By packing the titania nanotube powder particles in HPLC, UHPLC columns, the filtering articles described herein may have applications in biochemical separation such as for proteins, peptides, etc. In one embodiment, when compared to silica particles in the pre-existing liquid chromatography columns, titania is more robust and may withstand higher temperatures and strongly acidic environments. Also, the filtering articles described herein provide better packing because of the cylindrical morphology of the nanotubes. Unlike spherical silica particles, which may result in packing of up to 60-70%, with the cylindrical morphology the packing may be up to 90%. Moreover, titania, in contrast to silica, may be easily functionalized with a variety of materials for a wider range of biochemical separations. Further, since each powder grain of the filtering article described is a bundle of nanotubes, the filtering articles described herein effectively have very high surface areas with enhanced porosity. This may relax the high pressure requirements in the separation column.

Provided in one embodiment is a method of separating, the method comprising: separating a filtrate from a fluid containing the filtrate by exposing the fluid to a filtering article; wherein the filtering article comprises powders comprising bundles of nanotubes, each bundle comprising hollow titania nanotubes.

The filtering articles provided herein have numerous advantages over the pre-existing filtering articles. For example, the filtering article may allow filtration to take place with efficiency and yet at a pressure that is the same or lower than that needed for the pre-existing filtration membranes. The separation may be carried out at a pressure that is the same or lower than pre-existing filtering techniques. For example, the separation described herein may be about 50% of that needed for a filtering article comprising SiC nanoparticles. In one embodiment, the separation may be carried out at a pressure below about 7 atm—e.g., below about 6 atm, about 5 atm, about 4 atm, about 3 atm, about 2 atm, about 1 atm, about 0.5 atm, about 0.2 atm, about 0.1 atm, about 0.05 atm, or lower. In one embodiment, the pressure is between about 0.05 atm and about 7 atm, between about 0.1 atm and about 6 atm, between about 0.2 atm and about 5 atm, between about 0.4 atm and about 4 atm, between about 0.6 atm and about 4 atm, between about 0.8 atm and about 3 atm, between about 1 atm and about 2 atm, and the like. In one embodiment wherein the filtering article takes the form of a membrane, the filtering article has a permeability to water for trans membrane pressure below about 1 atm.

Additionally, the filter articles may be resistant to corrosions (e.g., chemical corrosion) as a result of exposure to the material to be filtered. For example, the filtering article may be resistant to a corrosive agent. In one embodiment, the resistance to corrosion may refer to the structural integrity of filtering article remains the same after exposure to a corrosive agent.

Additional advantages of the filtering articles (and the methods of making and using the same) over pre-existing methods, devices, or materials include tight control over the separation—the filtering articles and methods described in at least one embodiment herein provide capability of control down to about 20 nm, which is almost five times smaller than pre-existing filtering article technology. The filtering articles and methods described herein also allow scaling up flexibility without difficulty. Additionally, the filtering articles described herein may have a much lower manufacturing cost than pre-existing membranes due at least in part to the fact that titania and the method of making the filtering article using the method described herein are less expensive—and in at least one instance, the cost of materials described herein (e.g., about $3/g in one embodiment) may be about 20% lower than that of the pre-existing materials. In one embodiment, because the amount of material for a single 1 cm diameter pellet is about 0.1 g, even taking into account additional equipment usage costs (such as high-pressure press) and the fact that there will be further processing to build membrane supports, the cost per membrane is estimated to be around $3/pellet. This is much less expensive than the costs for pre-existing membranes.

The filtering articles described herein may also be more robust and resistant to changes in temperatures and pH than pre-existing filtering articles. Also, the filtering articles described herein may also have higher active surface areas due in part to the porosity of the hollow nanotubes (while maintaining filtration efficiency) than pre-existing filtering articles. Moreover, the methods described herein may allow fabrication of an in-situ porous filtering article that does not need additional processing to make the filtering article porous, in comparison to pre-existing filtration membranes comprising solid nanoparticles (as opposed to the hollow nanotubes described herein)—this may further reduce overall cost. Further, the filtering articles and methods described herein allow the ability to offer selective filtration through control of material properties, including ligand attachment, addition of dopants, etc.

NON-LIMITING WORKING EXAMPLES

Example 1—Synthesis of Titania Nanotubes Powders and Optimization For High Yield Rates Titania nanotubes powders were synthesized using the electrochemical method described in U.S. Pub. No. 2010/0014879. Specifically, DC anodization of titanium foil in chloride-ions containing acidic aqueous solutions (See FIG. 1(a)) resulted in the rapid formation of titania nanotubes bundles 1-100 μm long and up to several microns wide. These grains were continuously released into the solution, in time forming a white precipitate (see FIG. 1(b)) which was later recovered, washed and dried to a white titania powder (FIG. 1(c)) containing of micron-sized uniquely nanostructured grains (see FIG. 2).

The grains were found to have elongated shapes (2-10:1 aspect ratio), with lengths in the range of 1-100 μm. Further sieving and/or ball milling were used in at least some samples to reduce the size ranges of the powder grains.

Further steps were performed to optimize the anodization conditions for the efficient synthesis of large quantities of nanotubes powders. By varying parameters such as chloride ions concentration (0.1-0.5 M), anodization voltage (10-20 V) and pH (1.8-3), their influence on the yield of the final powders were examined. All other conditions such as titanium foil size, distance between anode and cathode, and anodization time were kept constant. The yield was estimated in three different ways: by weighing the titanium foil before and after anodization, by weighing the final powder, and by recording the average anodization current which is related to the nanotubes formation rate. Efficiency of titanium to titanium oxide conversion was also calculated as a molar percentage ratio.

It was discovered that the formation rate increases with increasing voltage, chloride ions concentration and decreasing pH. Subsequently, chloride ions concentrations of 0.1-0.2 M, a pH below 2, and voltages in the range of 12 were employed to ensure an average anodization current per unit area of titanium foil between 50 and 100 mA/cm$^2$ to be the optimal conditions for the fast synthesis of titania nanotubes powders. This resulted in powder yield rates around 1 g/hour, for a process that may be further scaled up all the way to industrial size (batches of kilograms of powders).

Example 2—Production of Filtration Pellets

Titania nanotubes powders produced by the method described above were subsequently pelletized using a hydraulic manual press under pressures between 5000 and 15000 psi. By varying the press load, the pressing dies, the mass of the pelletized powder (0.05-0.5 g) and the pressing times (1-10 minutes), pellets with 1-2.5 cm diameters and 1-3 mm thicknesses were obtained (see FIG. 1(d)), with a calculated density of about 40% of the single crystal anatase.

Figure 3:
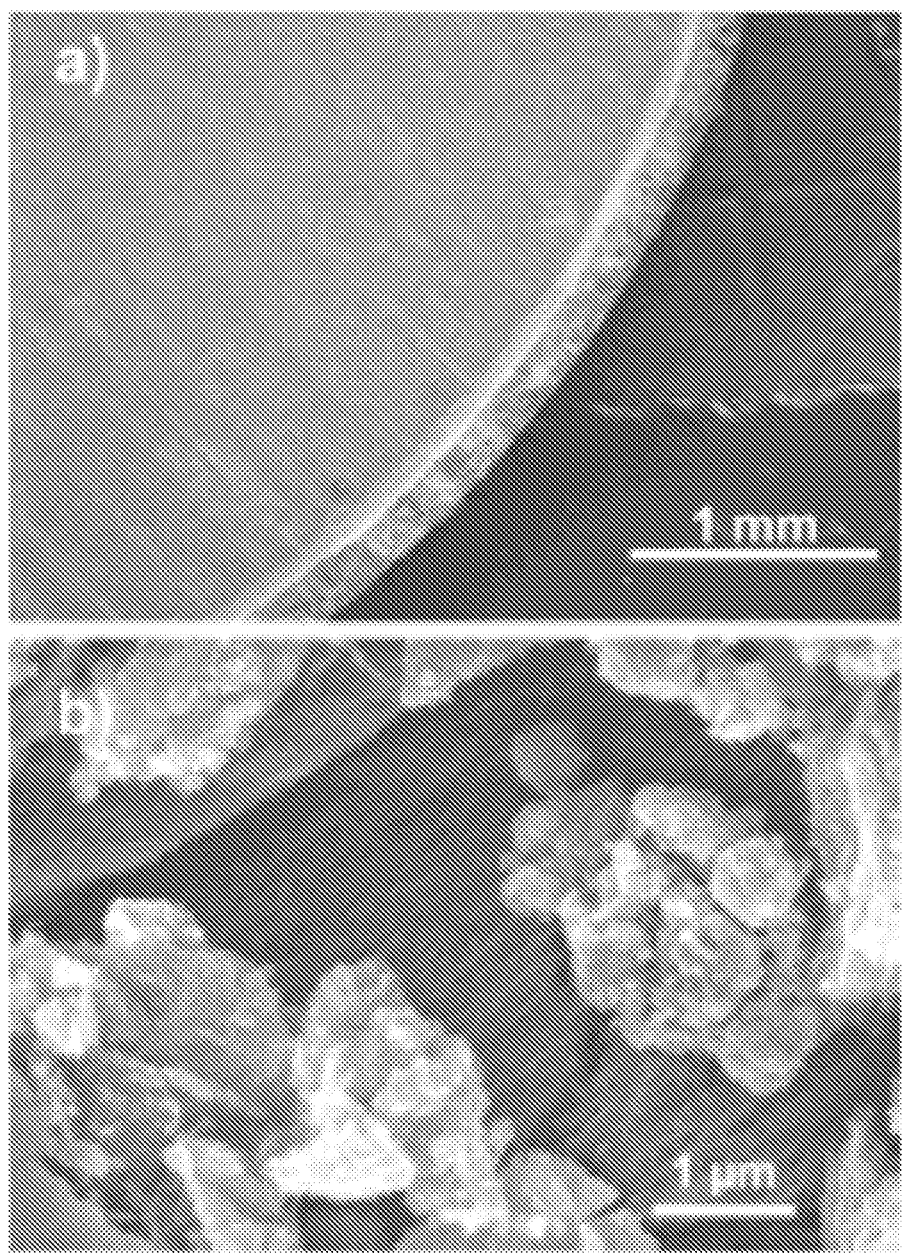
FIGS. 3(a)-3(b) show SEM images of a pellet made from titania nanotubes powders in one embodiment: (a) low magnification image presenting the flattened surface and a thin indentation on the edges; and (b) high magnification image in a cracked area demonstrating that the grains maintain the nanotubular morphology after compression.

Referring to FIG. 3, SEM imaging shows that the grains may withstand such pressure without being crushed, thus maintaining the nanotubular morphology. Alternatively, molding into custom shapes and sintering were used in order to achieve higher durability.

Example 3—Water-Oil Separation Experiments

This experiment was performed with the as-is pellets described above in a filtration setup (FIG. 4(a)) and showed permeability to water for trans-membrane pressure (TMP) below 1 atm, and resistance to kerosene. Deionized water flow rates of about 1.1 m$^3$/(m$^2$·h) were obtained for this non-optimized system, and yet the results from this not-yet-optmization system are comparable with the flow rates of current state-of-the-art water-oil separation solutions. The nanomorphology of the powders and nanoporosity of the membranes offer higher active surface areas, translating into higher permeability of the membrane (higher flowing rate) without affecting the filtration efficiency. Other advantages of the material include better resistance and robustness in high temperatures or highly acidic media.

The pellets were further employed in a simulated closed-cycle cross-flow filtration setup (FIGS. 4(b)-(c)) to demonstrate successful separation of oil-water mixtures at TMPs lower than 5 atm, well below pressure requirements of current solutions. Water was almost completely recovered from initial mixtures containing between 10% and 50% kerosene, at flow rates of up to 1 m$^3$/(m$^2$·h).

Figure 6:
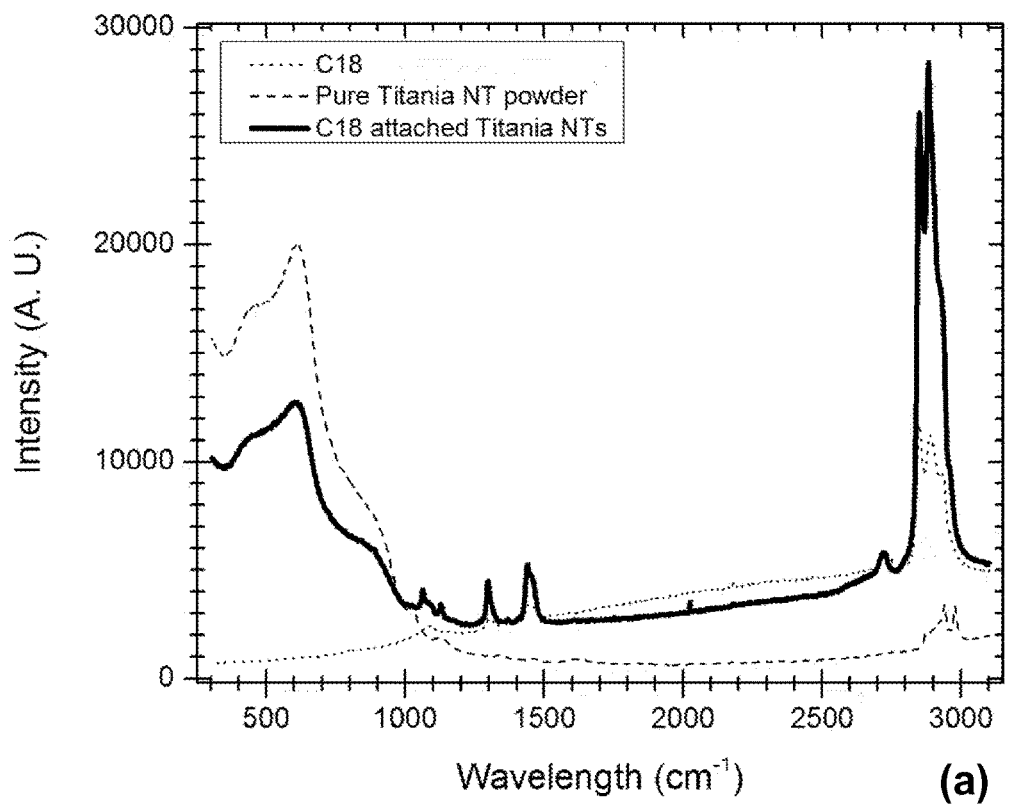
FIGS. 6(a)-6(b) show the effect of functionalizing the titania nanotubes: (a) RAMAN spectra of a sample of titania nanotubes powder after C18 ligand was attached (solid bold line). A pure titania nanotube powder spectrum (dashed line) and correspondingly pure C18 spectrum (dotted line) were also recorded for comparison; and (b) water droplets on the surface of pellets synthesized from C18-attached titania nanotubes.
Figure 6:
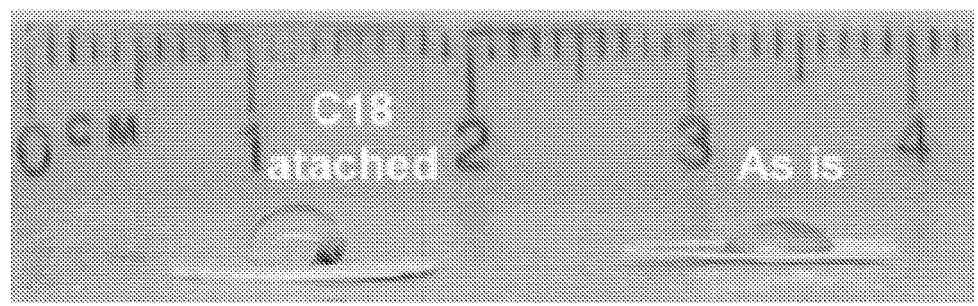

Example 4—Functionalization For Specialized Filtration and Separation Applications For custom applications, one may also appropriately functionalize the titania nanotubes to further aid in the separation. The structures were successfully functionalized with hydrophobic entities such as octadecyl (C18) molecules, and oleophobics such as Fluorooctyltrichlorosilane (FOTS). Attachment was confirmed by Raman spectroscopy, while hydro- and oleophobicity was estimated by contact angle measurements. FIG. 6(a) shows RAMAN spectra of a sample of titania nanotubes powder after C18 ligand was attached (bold continuous line). A pure titania nanotubes powder spectrum (dashed line) and correspondingly pure C18 spectrum (dotted line) were also recorded for comparison. FIG. 6(b) shows water droplets on the surface of pellets synthesized from C18-attached titania nanotubes. The large contact angle is distinct when compared to water droplets on the surface of pellets synthesized from as-is nanotubes.

Additional Notes

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:

1. A filtering article comprising:
   i) a pellet of powders, the powders comprising bundles of hollow titania nanotubes; and
   ii) a freestanding array of hollow titania nanotubes aligned in parallel,
   wherein the pellet and the freestanding array are integrated together in the filtering article.

2. The filtering article of claim 1, wherein in the pellet of powders,
   at least some of the bundles have a length of at least about 1 micron.

3. The filtering article of claim 1,
   wherein the freestanding array has
   a topographical surface area of at least 1 cm$^2$.

4. The filtering article of claim 1, wherein the pellet has a diameter of at least 1 cm.

5. The filtering article of claim 1, wherein a side of the filtering article exposed to a material to be filtered comprises the freestanding array.

6. The filtering article of claim 1, wherein at least some of the hollow nanotubes of the pellet or freestanding array are functionalized by at least one of a hydrophobic material and an oleophobic material.

7. The filtering article of claim 1, wherein the filtering article
   is permeable to water at transmembrane pressures below about 1 atm.

8. The filtering article of claim 1, wherein the hollow titania nanotubes of the pellet or freestanding array comprise anodized titanium.

9. An article comprising the filtering article of claim 1, wherein the filtering article is at least one of a water filtration membrane, a water-oil separation membrane, and a liquid chromatography column.

10. The filtering article of claim 1, wherein in the pellet of powders, at least some of the bundles have a width of at least 1 micron.

11. The filtering article of claim 1, wherein in the pellet of powders, at least some of the hollow titania nanotubes have a diameter between about 25 nm and about 50 nm.

12. The filtering article of claim 1, wherein in the freestanding array, at least some of the hollow titania nanotubes have a diameter between about 60 nm and about 300 nm.

13. The filtering article of claim 1, wherein in the freestanding array, at least some of the hollow titania nanotubes have a length of at least about 1 micron.

14. The filtering article of claim 1, wherein the pellet has a thickness of at least 1 mm.

15. The filtering article of claim 1, wherein the freestanding array is on top of the pellet, and the array and pellet are sealed at an edge.

16. The filtering article of claim 1, wherein the pellet and the freestanding array are separate components in the filtering article such that a fluid to be filtered passes through the pellet and the freestanding array in consecutive filtering components.

17. A method of separating a filtrate from a fluid containing the filtrate, the method comprising:
    exposing the fluid to a filtering article, wherein the filtering article comprises:
      i) a pellet of powders, the powders comprising bundles of hollow titania nanotubes; and
      ii) a freestanding array of hollow titania nanotubes aligned in parallel;
    wherein the pellet and the freestanding array are integrated together in the filtering article; and
    wherein the fluid is exposed to the freestanding array prior to the powders.

18. The method of claim 17, wherein exposing the fluid to a filtering article is carried out at a pressure below about 6 atm.

19. A method of making a filtering article, the method comprising:
    (i) anodizing titanium in an aqueous electrolyte solution to form powders comprising bundles of hollow titania nanotubes, the aqueous electrolyte solution comprising at least about 1 mM chloride and having a pH from about 1 to about 7;
    (ii) forming the powders into a pellet;
    (iii) anodizing titanium in a non-aqueous electrolyte solution to form a freestanding array of hollow titania nanotubes aligned in parallel, the non-aqueous electrolyte solution comprising at least about 1 mM fluoride; and
    (iv) integrating the pellet and freestanding array together to make the filtering article.

20. The method of claim 19, further comprising functionalizing at least some of the hollow titania nanotubes of the pellet or freestanding array with at least one of a hydrophobic material and an olephobic material.

* * * * *